United States Patent
Negovan

(10) Patent No.: US 10,648,586 B1
(45) Date of Patent: May 12, 2020

(54) AUTOMATED DRAIN VALVE WITH INTERNAL RESET

(71) Applicant: Alexander Lee Negovan, Jamison, PA (US)

(72) Inventor: Alexander Lee Negovan, Jamison, PA (US)

(73) Assignee: THERM-OMEGA-TECH, INC., Warminster, PA (US)

( * ) Notice: Subject to any disclaimer, the term of this patent is extended or adjusted under 35 U.S.C. 154(b) by 0 days.

(21) Appl. No.: 16/196,084

(22) Filed: Nov. 20, 2018

(51) Int. Cl.
*F16K 31/00* (2006.01)
*F16K 31/56* (2006.01)

(52) U.S. Cl.
CPC ............ *F16K 31/002* (2013.01); *F16K 31/56* (2013.01)

(58) Field of Classification Search
CPC .. F16K 31/002; F16K 31/52; Y10T 137/1353; Y10T 137/1963
See application file for complete search history.

(56) References Cited

U.S. PATENT DOCUMENTS

| | | | |
|---|---|---|---|
| 2,388,669 A | 11/1945 | Baker | |
| 2,756,761 A * | 7/1956 | Cook | G05D 23/00 137/79 |
| 4,265,267 A | 5/1981 | Cyphelly | |
| 4,361,167 A | 11/1982 | Harasewych | |
| 4,848,389 A * | 7/1989 | Pirkle | E03B 7/10 137/80 |
| 5,113,891 A | 5/1992 | Carney | |
| 5,826,790 A * | 10/1998 | Raether | G05D 23/022 236/48 R |
| 6,029,686 A | 2/2000 | Pirkle | |
| 6,325,092 B1 | 4/2001 | Pirkle | |
| 7,878,417 B2 | 2/2011 | Brown et al. | |
| 9,879,796 B2 | 1/2018 | Tallos et al. | |

* cited by examiner

*Primary Examiner* — Reinaldo Sanchez-Medina
(74) *Attorney, Agent, or Firm* — Cusick IP, PLLC; Clinton J. Cusick, Esq.

(57) ABSTRACT

An automated thermally responsive valve with an internal reset function is disclosed. The cartridge latching mechanism can be retracted at a target temperature and manually reset at the target temperature to engage an ejector cap. The reset mechanism of the cartridge automatically returns to a latching configuration upon warming. The cartridge thermal actuator can be configured to retract the latching mechanism at a target temperature near freezing to provide a freeze protection drain valve that is ejected from a sealing element in the ejector cap and allows a fluid system to drain.

17 Claims, 11 Drawing Sheets

AUTOMATED DRAIN VALVE WITH INTERNAL RESET

BACKGROUND OF THE INVENTION

Field of the Invention

The present general inventive concept is directed to an automated drain valve that automatically opens upon reaching a target temperature to vent a system, can be reset when the system is at the target temperature, and can automatically revert to an operating configuration when the system moves outside of a target temperature range. The automated drain valve can provide freeze protection where the target temperature is selected near freezing temperatures.

Description of the Related Art

Freeze protection valves or drain-type valves are known in the art. U.S. Pat. No. 6,029,686 is directed to a thermally responsive valve. U.S. Pat. No. 6,325,092 is directed to a thermally responsive valve. These valves provided freeze protection and can open a system to drain at cold temperatures by ejecting a valve cartridge from a plug position in an ejector cap. A disadvantage of the prior art drain valves is that they are difficult to reset at a target temperature range, e.g. in cold temperatures, and additional measures are needed to retain the valve cartridge in the ejector cap. For example, a valve cartridge might be discharged during low temperatures at night. An operator may wish to reset the system and install the cartridge in the morning when ambient temperatures are still cold. Prior drain valves have relied on external mechanisms and user intervention where the valve cartridge had to be warmed and inserted in the ejector cap and retained by a physical restraint to retain the valve cartridge in the ejector cap at cold temperatures. A penny was used as the physical restraint in the embodiment named a penny pincher valve shown in FIG. 8 of the '686 Patent. In other products, a manual override slot is provided to retain the valve cartridge in the valve body at cold temperatures. These workarounds are inconsistent and unreliable and require a supply of pennies or maintenance of external override slots that can be fouled by dirt or debris in normal operation. Where the drain valve is used on a low point of a water cooling system of a locomotive, for example, extensive entrained dust and debris is encountered. User modification and workarounds often interfere with the operation of the cartridge.

What is needed is a freeze protection valve with a reset mechanism that is internal, can be reset at cold temperatures, and can automatically return the valve to an operating configuration upon warming.

SUMMARY OF THE INVENTION

It is an aspect of the present invention to provide an automated drain valve with a retaining mechanism to retain a valve cartridge in an ejector cap at warmer temperatures, a thermal actuator to retract the retaining mechanism at a colder target temperature range, a reset mechanism to reset the cartridge near the target temperature range, and the retaining mechanism and reset mechanism act to automatically convert the retaining mechanism to normal operation upon warming of the valve cartridge above the target temperature range.

The above aspects can be obtained by an automated cartridge comprising a body having a distal end and a proximal end, a reset ball, a retention ball, an actuator cam disposed within said body and biased towards said proximal end by an actuator spring, a reset cam disposed within said body and biased away from said actuator cam by a reset spring, and a thermal assembly configured to move a piston disposed in said reset cam; wherein movement of said actuator cam controls movement of said retention ball into a retention opening disposed in said body and wherein movement of said reset cam controls movement of said reset ball into and out of an override groove disposed in said body.

Another embodiment is disclosed wherein an automated cartridge comprises a valve body comprising a first retention opening, a second retention opening, and a third retention opening, an actuator cam comprising a first reset opening, a second reset opening, and third reset opening, a reset cam disposed within said actuator cam and providing an inner border, an override groove disposed on an interior of said valve body and providing an outer border, a plurality of reset balls comprising a first reset ball disposed in said first reset opening, a second reset ball disposed in said second reset opening, a third reset ball disposed in said third reset opening, a plurality of retention balls comprising a first retention ball disposed in said first retention opening, a second retention ball disposed in said second retention opening, and a third retention ball disposed in said third retention opening; said actuator cam comprises a latching section configured to force said plurality of retention balls exterior to said body to form a latching feature; a thermal assembly configured to position said latching section adjacent said plurality of retention balls when said thermal assembly is above a target temperature.

Another embodiment of the invention discloses an automated drain valve comprising an ejector cap comprising at least one J-groove; a cartridge configured to fluid seal said ejector cap and comprising a latching feature and a thermally responsive reset cam; wherein said latching feature is configured for rotational insertion into said ejector cap and retention in said at least one J-groove; a thermal actuator upon cooling to a target temperature positions an actuator cam to retract said latching feature and cause ejection of said cartridge from said at least one J-groove of said ejector cap and remove said fluid seal; said reset cam is configured to block a reset ball and position said actuator cam to extend said latching feature; and said thermal actuator upon warming above said target temperature moves said reset cam to unblock said reset ball and position said reset cam against said actuator cam to maintain extension of said latching feature.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the embodiments, taken in conjunction with the accompanying drawings of which.

DESCRIPTION OF THE PREFERRED EMBODIMENTS

Figure 1:
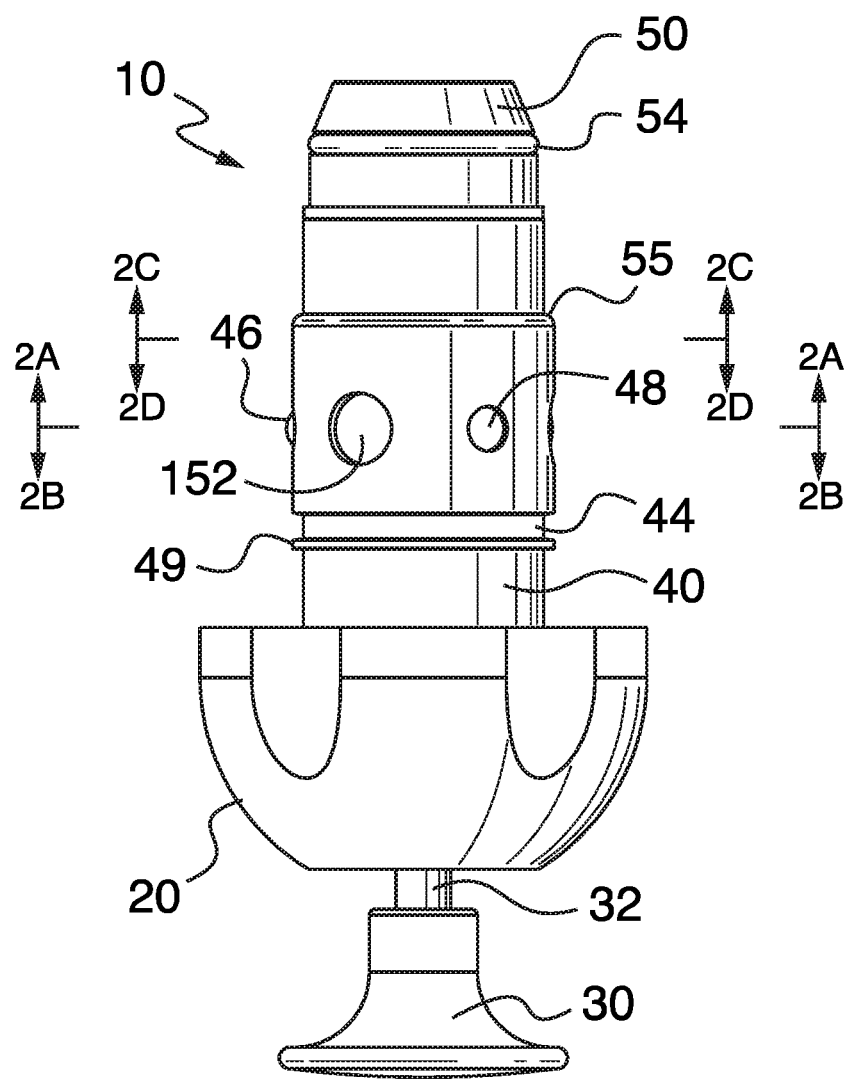
FIG. 1 is a side view of a cartridge in an embodiment of the invention.

Reference will now be made in detail to the presently preferred embodiments of the invention, examples of which are illustrated in the accompanying drawings, wherein like reference numerals refer to like elements throughout.

The present inventive concept relates to an automated drain valve that is thermally responsive, and an embodiment that comprises a retaining mechanism to eject a cartridge upon reaching a target temperature. A latching cartridge can be combined with an ejector cap to fluid seal a system during operation and drain the system upon ejection. A cartridge is disclosed that provides a manual cold reset that can be used to facilitate latching connection between the cartridge and the ejector cap and reset the drain valve operation.

FIG. 1 presents a side view of a cartridge 10 in an embodiment of the invention. The body 40 is shown with first retention ball 46 protruding from the body 40. Third retention ball 48 can be positioned opposite first retention ball 46, and in an embodiment, three retention balls can be utilized and spaced approximately 120 degrees apart. The cartridge body 40 can comprise retainer features so that when the cartridge is ejected, it is not lost. A lanyard, not shown, can be connected in retainer groove 44 that can be accentuated by retainer lip 49. Body 40 can be connected with sealing end 50, for example by threaded connection. Sealing element 54 can be provided in the form of an O-ring. Turn knob 20 can be knurled or indented and provide an easy surface for turning the cartridge. Turn knob 20 can be press fit with the distal end of body 40. Distal end of body 40 can be knurled prior to the press fit connection of turn knob 20 to facilitate retention of turn knob 20 on body 40. Handle rod 32 can be connected to reset means that can comprise a reset handle 30 or other elements configured for grasping or being tensioned.

Figure 2A:
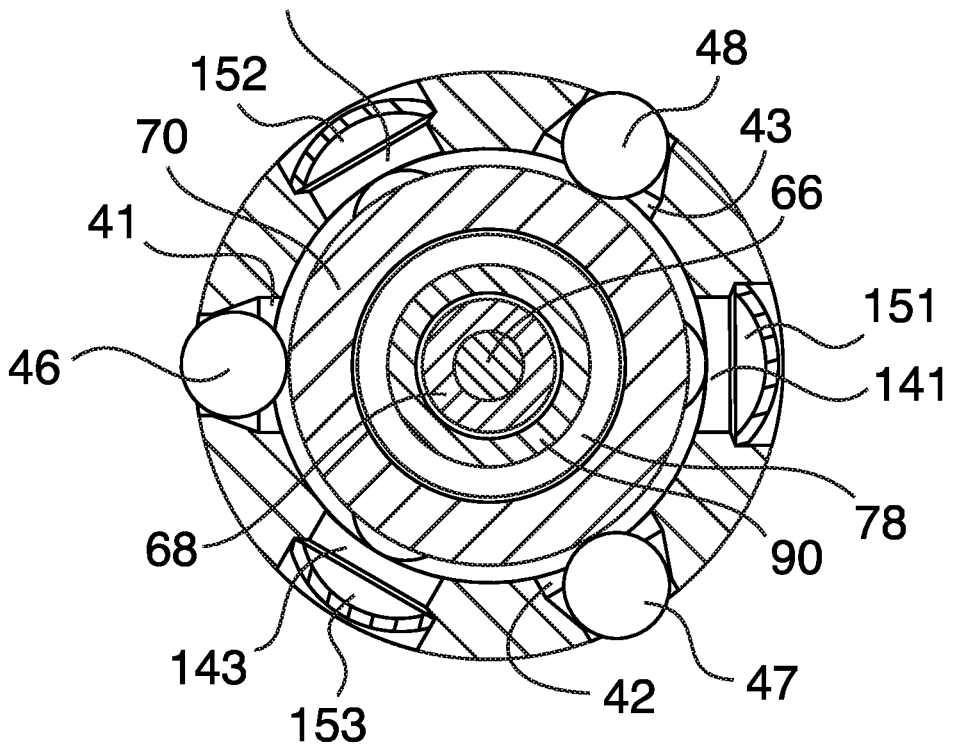
FIG. 2A is a section view of a retaining mechanism of a cartridge in an embodiment of the invention.

FIG. 2A presents a section view of a cartridge 10 in an embodiment of the invention showing a retaining mechanism and viewing the sealing end 50 at the proximal end of the cartridge. The various section views presenting in FIGS. 2A through 2D correspond to the locking configuration of cartridge 10 also presented in FIG. 4A. The proximal end can be inserted into an ejector cap 200 shown in FIG. 5A. When the sealing end 50 is inserted, it serves as a plug, and the cartridge can be viewed as part of a plug valve. When the cartridge is ejected, it leaves a void that serves as a drain, and the cartridge can be considered to be part of a drain valve. Body 40 is shown in a cross section with first retention opening 41 receiving first retention ball 46, second retention opening 42 receiving second retention ball 47, and third retention opening 43 receiving third retention ball 48. Retention opening 41 can be conical in shape or frustoconical and preferably has a maximum opening diameter less than the diameter of first retention ball 46. The exterior wall of actuator cam 70 provides an inward limit to the radial travel of the retention balls 46, 47, 48, and in a locking configuration shown here, forces all three retention balls to protrude beyond the periphery of body 40. A locking configuration describes retention balls forced out of body 40 to present extended dimensions. In a method of construction, body 40 can be drilled to produce retention openings, e.g. 41. The retention openings can be drilled from the exterior with a shaped drill bit, or as shown in FIG. 2A, can be drilled through the opposite side of body 40. This process creates access hole 141 which can be sealed with access insert 151 which can be formed of metal, plastic, or silicone or other materials. Access hole 142 can be formed in the creation of retention opening 42 and sealed with access insert 152, and access hole 143 can be formed in the creation of retention opening 43 and sealed with access insert 153. It can be appreciated that the embodiment of FIG. 2A can be rotated 120 degrees and provide the same features. In an alternate embodiment, two retention balls can be provided spaced apart by any feasible angle, but for symmetry of operation, spaced apart by 180 degrees. Other embodiments can comprise more or less retention openings and retention balls in the spirit of the invention.

Figure 2B:
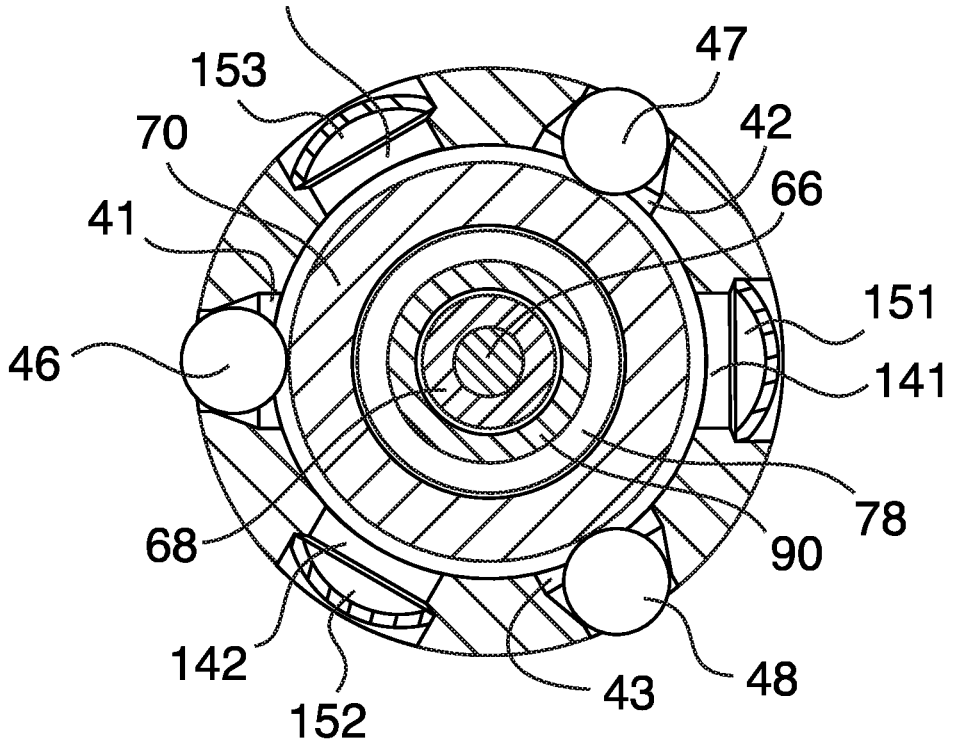
FIG. 2B is a section view of a retaining mechanism of a cartridge in an embodiment of the invention.

FIG. 2B is a section view of a cartridge in an embodiment of the invention showing a retaining mechanism along the same section line as FIG. 2A and viewed distal towards handle rod 22. Actuator cam threaded end 78 is shown outside reset cam 90. Reset spring 92 is not shown in this view for clarity.

Figure 2C:
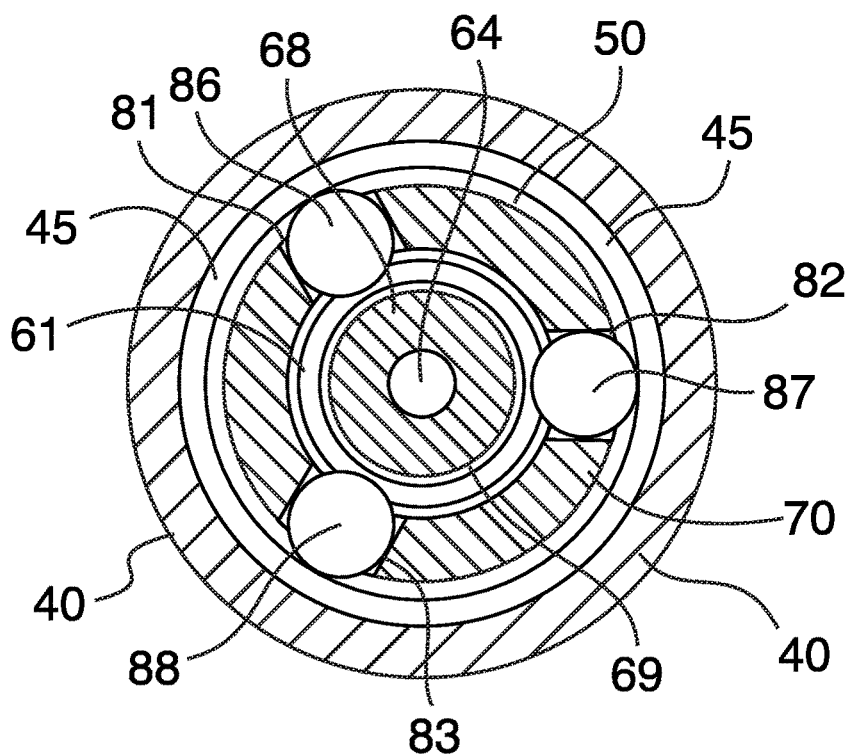
FIG. 2C is a section view of a reset mechanism of a cartridge in an embodiment of the invention.

FIG. 2C presents a section view of a reset mechanism viewed towards a proximal end. Present are first reset ball 86, second reset ball 87, and third reset ball 88. The reset balls can be provided in the same size and shape and can be interchangeable in an embodiment of the invention. At least one reset ball, or two or more reset balls positioned across from each other can interact with body 40 and override groove 45 to provide a cold reset. Actuator cam 70 is shown comprising three openings suited for receiving three reset balls. First reset opening 81 receives first reset ball 86, second reset opening 82 receives second reset ball 87, and third reset opening 83 receives third reset ball 88.

Figure 2D:
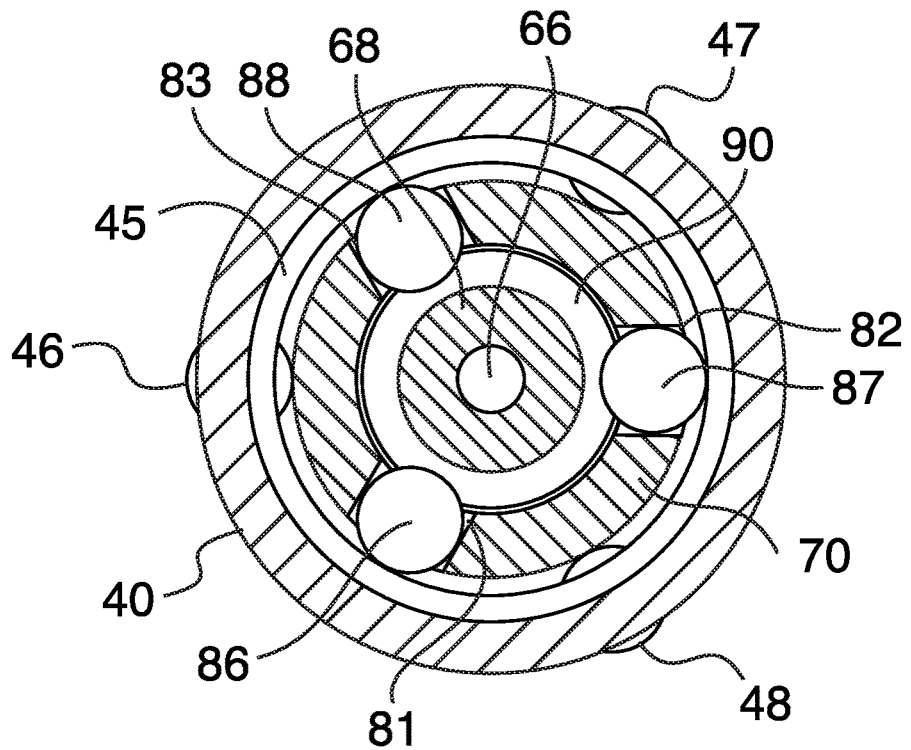
FIG. 2D is a section view of a reset mechanism of a cartridge in an embodiment of the invention.

FIG. 2D presents a section view of a reset mechanism viewed towards a distal end. Retention balls 46, 47, and 48 are viewable protruding out of body 40. The position of first retention ball 46 exterior of body 40 creates an external latching feature that can provide latching connection explained herein. The position of second retention ball 47 and third retention ball 48 exterior of body 40 create additional latching features in the form of a rigid protrusion. Reset cam 90 is viewable over the interior diameter of reset balls 86, 87, and 88. The position of reset cam 90 allows reset balls to move interior to body 40 or forces the reset balls into override groove 45. Override groove 45 provides an outer border against the radial movement of reset balls 86, 87, and 88.

Figure 3:
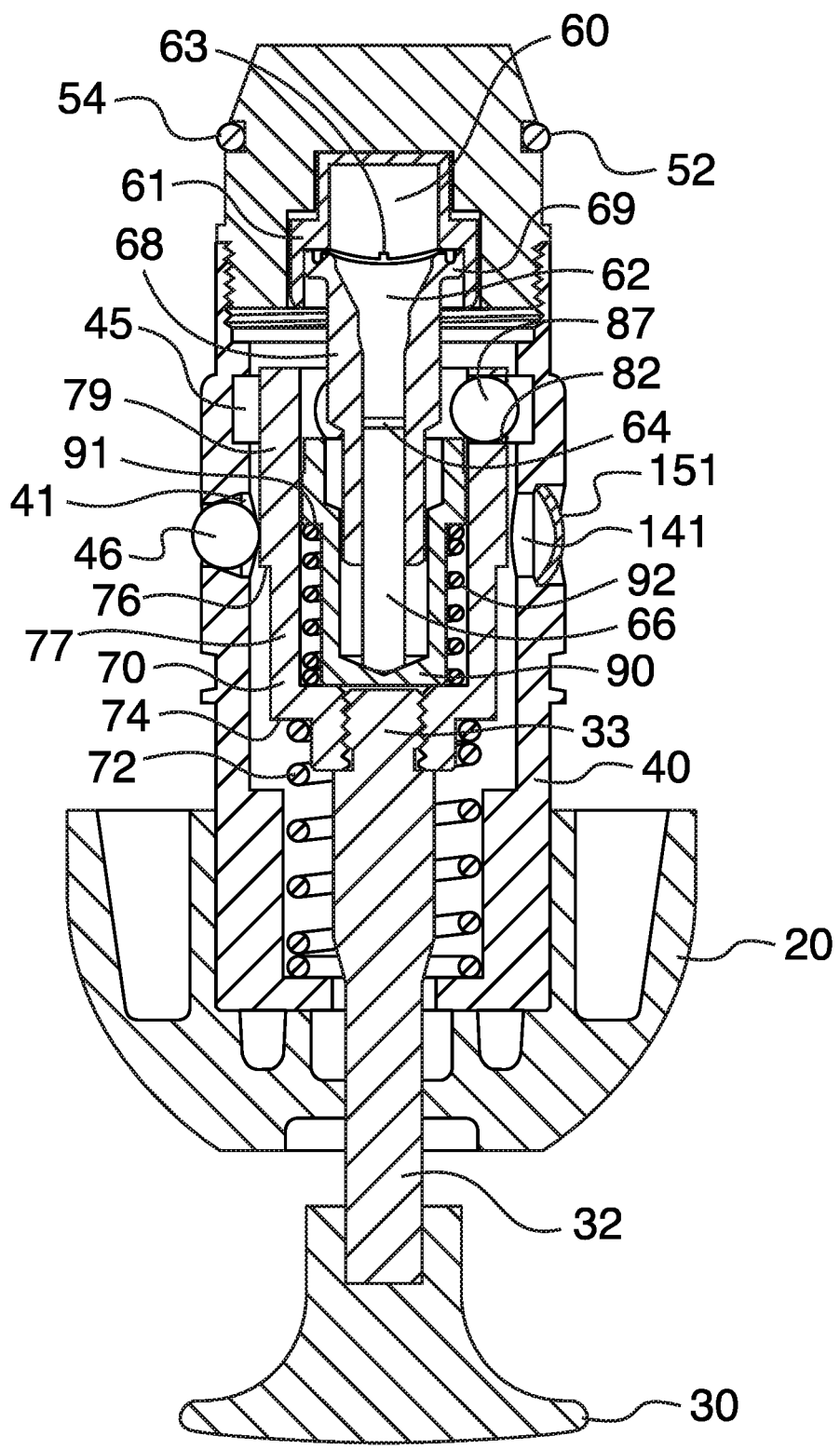
FIG. 3 is a section view of a cartridge in an embodiment of the invention.

FIG. 3 is a section view of a cartridge in an embodiment of the invention. Thermal actuator means is utilized to move reset cam 90 against actuator cam 70 in normal operation. In an embodiment, thermal actuator means can comprise cup 61 configured to receive a thermally expansive substance 60, for example wax, that can expand against diaphragm 63 to force cone 62, and antiextrusion disk 64 to move piston 66. A thermal assembly can comprise a thermally expansive substance and means for transmitting expansion to a piston. One thermal assembly is shown in the embodiment of FIG. 3, and other thermal assembly configurations or thermal actuator means can be utilized in the spirit of the invention. A suitable thermal assembly is described in U.S. Pat. No. 9,879,796, the disclosure of which is incorporated by reference. In a freeze protection embodiment shown in FIG. 3, piston 66 is shown extended and reset cam 90 has overcome the force of reset spring 92 to abut actuator cam 70 and overcome actuator spring 72. The cartridge 10 is shown in the locking configuration also shown in FIG. 4A. Upon cooling, piston 66 retracts and actuator cam 70 is forced towards proximal end, sealing end 50. Actuator cam 70 can be configured with recess shoulder 76 as the interface between recess section 77 and latching section 79. Actuator cam 70 presents a smaller diameter section in recess section 77. Latching section 79 presents a larger diameter than recess section 77. When latching section 79 is adjacent retention ball 46, for example, the cartridge is in a locking configuration with the plurality of retention balls pushed outward from body 40 to extend an external latching feature in the form of a fixed protrusion or extended diameter.

Figure 4A:
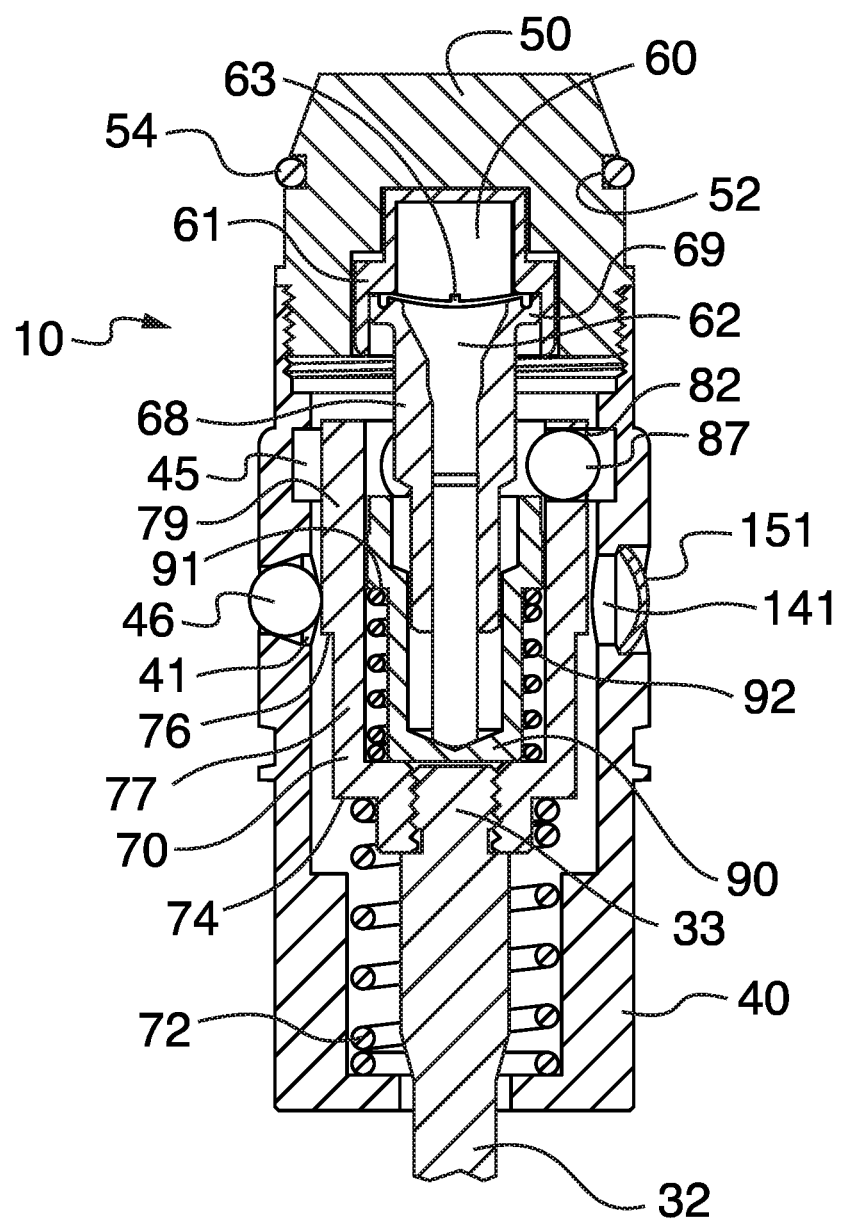
FIG. 4A is a section view of a cartridge in a locking configuration in an embodiment of the invention.

FIG. 4A is a section view of a cartridge 10 in a locking configuration in an embodiment of the invention. When warmed, thermal actuator means is extended and piston 66 pushes reset cam 90 and actuator cam 70 toward the distal end of body 40. This positions latching section 79 adjacent retention openings 41, 42, and 43, and presses retention balls 46, 47, and 48 partially out of the cartridge body 40. The retention balls can be made of metal, for example steel, and are effectively incompressible under operating conditions. The elements of cartridge 10 are preferably machined of metal including actuator cam 70, reset cam 90, body 40, and sealing end 50. When these elements are made of metal, for example steel, they do not appreciably yield under operating conditions. As a result, the presence of latching section 79 interior to the retention balls prevents them from moving interior to body 40 and keeps them pressed outward in fixed location.

Figure 4B:
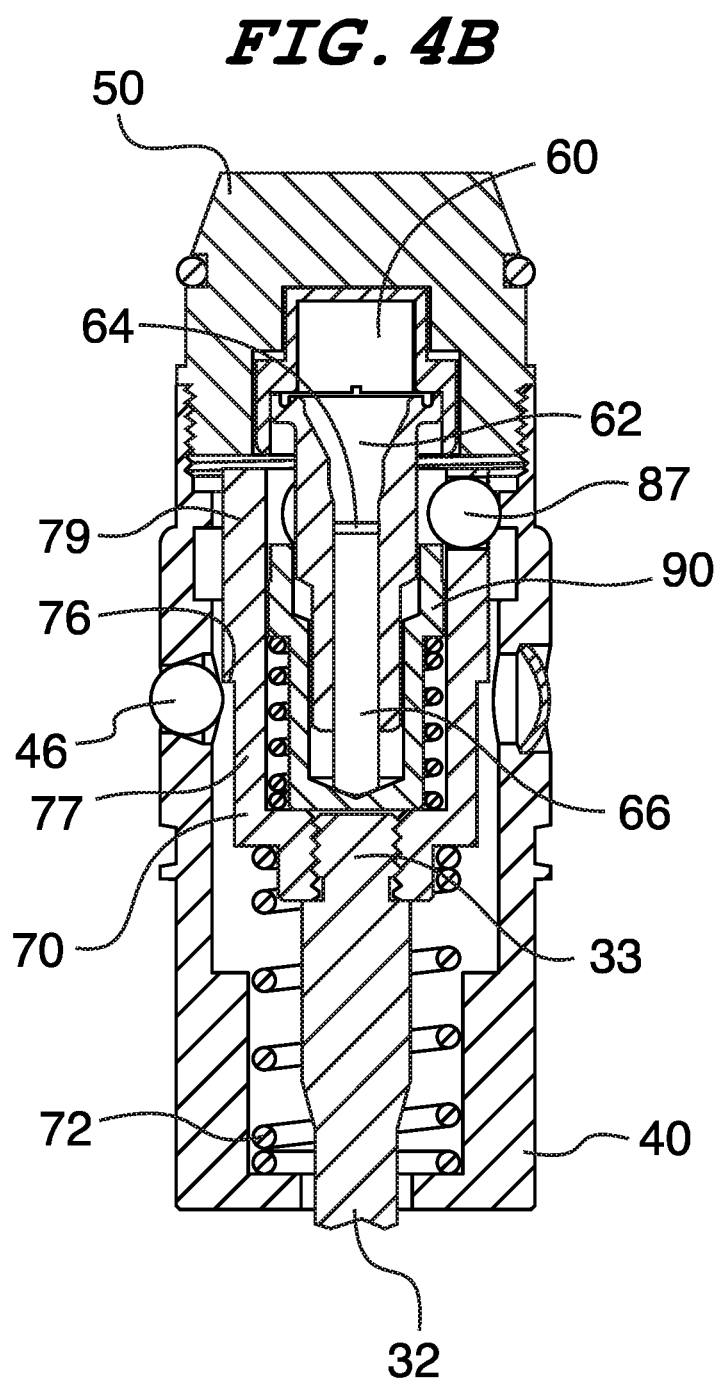
FIG. 4B is a section view of a cartridge in a release configuration in an embodiment of the invention.

FIG. 4B is a section view of a cartridge in a release configuration in an embodiment of the invention. When thermal actuator means is cooled to a target temperature, piston 66 is retracted, and actuator spring 72 forces actuator cam 70 and reset cam 90 towards sealing end 50. This movement causes recess section 77 to move adjacent to, e.g. first retention ball 46. The additional space provided by recess section 77 of actuator cam 70 allows the retention balls, e.g. first retention ball 46, to move inward or interior to the body 40 and retract the external latching feature. A small amount of force will cause the retention balls to move interior to cartridge body 40 and into the available space between body 40 and recess section 77. Cam 70 can be configured with thermal actuator means so that recess section 77 is positioned adjacent retention openings when thermally expansive substance 60 reaches a target temperature, e.g. 32 to 34 degrees F.

Figure 4C:
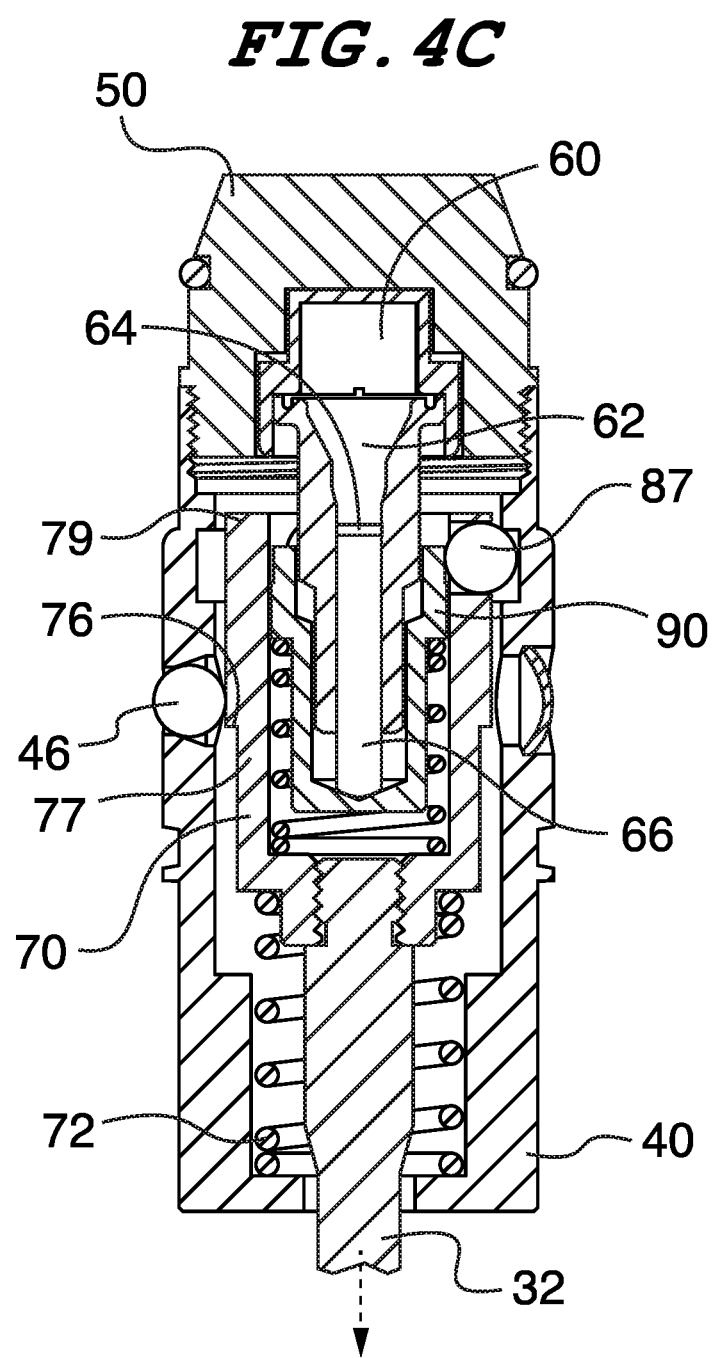
FIG. 4C is a section view of a cartridge in a reset configuration in an embodiment of the invention.

FIG. 4C is a section view of a cartridge in a reset configuration in an embodiment of the invention. The present invention provides a manual reset mechanism that enables the cartridge 10 to press the retention balls outward of body 40 while the thermal actuator means is still cold or below a target temperature. In a freeze protection valve embodiment, a target temperature can be selected in the range of 34 degrees F. This is accomplished by the interaction of the reset cam 90 with reset balls, for example first reset ball 86, second reset ball 87, and third reset ball 88. Reset spring 92 rests between reset cam shoulder 91 and actuator cam seat 71. Handle rod 32 can be attached, for example threadedly attached, to the distal end of actuator cam 70 so that pulling handle rod 32 draws actuator cam 70 against actuator spring 72 while reset spring 92 moves reset cam 90 away from actuator cam seat 71. The movement of actuator cam 70 relative to reset cam 90 separates the actuator cam 70 from the reset cam 90 and forces reset ball 87 into override groove 45. Reset opening 82 controls the axial movement of reset ball 87. When drawn distal by the reset handle 30 or handle rod 32, the axial position of reset ball 87 is determined by the position of reset opening 82 that moves axial with actuator cam 70. The outward radial movement of reset ball 87 is caused by reset cam 90 which ejects reset ball 87 outward when it is positioned adjacent override groove 45. The force is provided in part by reset spring 92 which then moves reset cam 90 into the blocking position relative reset ball 87 as shown in FIG. 4C to prevent movement of the reset ball 87 out of the override groove 45, radially inward, and reset cam 90 provides an inner border against inward radial movement of the reset balls. The presence of reset ball 87 as shown in FIG. 4C prevents actuator cam 70 from returning proximal to the release configuration and therefore latching section 79 continues to press the retention balls outward of body 40. Reset cam 90 will maintain its blocking position until the thermal actuator means is warmed and pushes piston 66 and reset cam 90 back against actuator cam seat 71. As reset cam 90 is moved back into connection with actuator cam 70, it no longer blocks the inward radial movement of reset ball 87, and the plurality of reset balls are unblocked, and reset ball 87 is shown resting in in reset opening 82. The maximum travel of actuator cam 70 can be limited by the diameter of return shoulder 74.

Figure 4D:
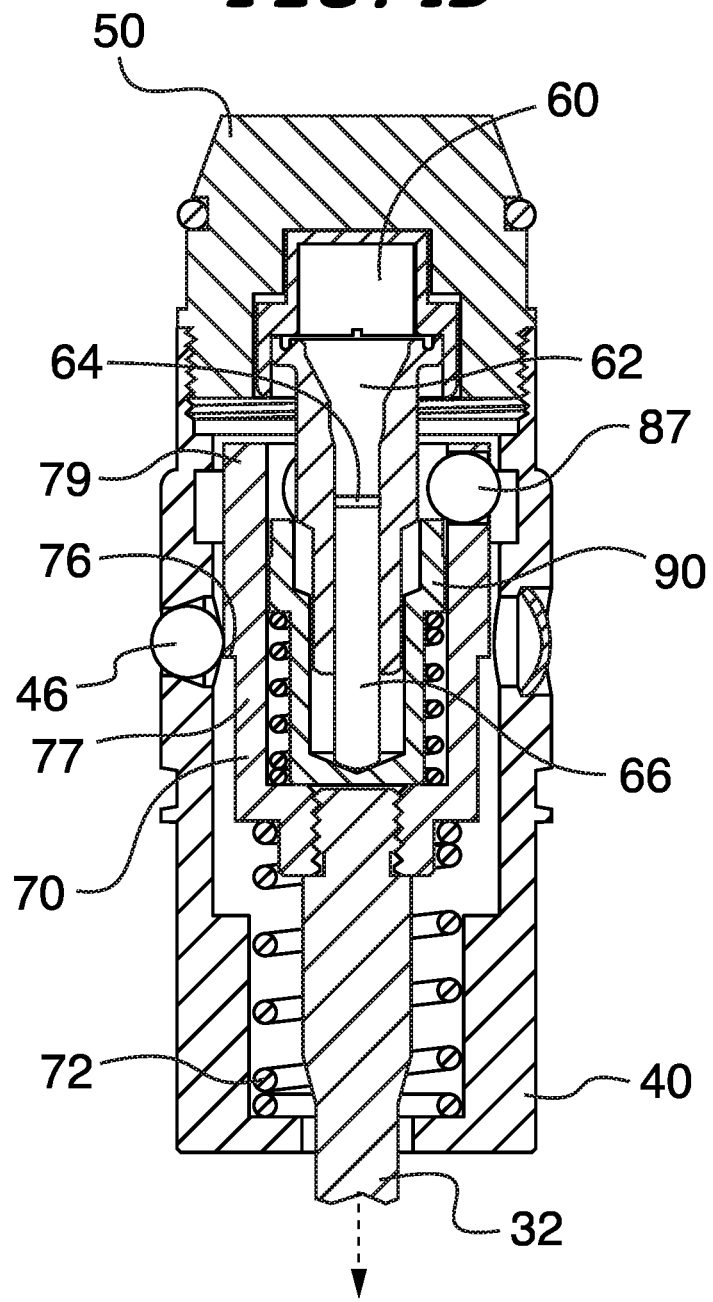
FIG. 4D is a section view of a cartridge in a locking configuration in an embodiment of the invention.

FIG. 4D is a section view of a cartridge in a locking configuration in an embodiment of the invention. This view shows the thermal actuator 60 partially expanded with piston 66 having positioned actuator cam 70 distal sufficient to place recess shoulder 76 past the midpoint of first retention ball 46. This view shows that the cartridge 10 has warmed sufficiently to move the reset cam 90 into hard contact with actuator cam 70. Reset cam 90 is configured in this embodiment to allow reset ball 87 to move interior of body 40 and out of override groove 45 at a temperature above the target temperature. As reset cam 90 moves distal, actuator spring 72 continues to bias actuator cam 70 proximal. At the point where reset cam 90 no longer blocks the radial movement of reset ball 87, the ball moves radially interior to the body 40, out of the override groove 45, and centered into reset opening 82. Further interior movement can be limited by the height of reset cam 90 shown in contact with reset ball 87. The force for this movement is provided by actuator spring 72 moving actuator cam 70 slightly proximal. Actuator cam 70 can be configured so that upon return of the reset balls to the reset openings, latching section 79 is still positioned to force the retention balls radially out of body 40 and form the external latching features as shown.

As shown in FIGS. 4A through 4D, the elements of the retaining mechanism and the reset mechanism are configured to cooperate so that latching section 79 encounters the retention balls at temperatures above the target temperature in FIGS. 4A and 4D, as well as when in the reset configuration of FIG. 4C. Recess shoulder 76 can be designed and machined to cooperate with a thermal actuator to be at the operating position at a desired target temperature and in an embodiment, move the reset cam distal from the override groove to contact the reset cam with the actuator cam 70. In an embodiment, actuator cam 70 and reset cam 90 can move in tandem. The selection of various waxes, wax blends, or other materials can provide expansion and contraction of the thermal actuator at desired temperature ranges.

Figure 5A:
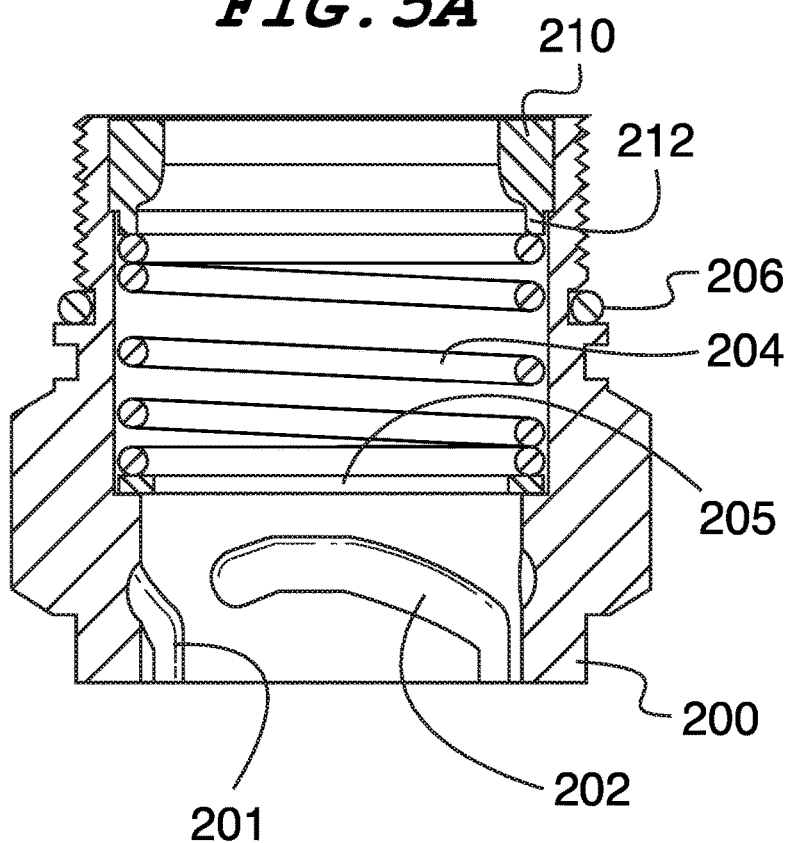
FIG. 5A is a section view of an ejector cap in an embodiment of the invention.

FIG. 5A is a section view of an ejector cap in an embodiment of the invention. Ejector cap 200 can comprise a plurality of J shaped grooves, for example J-groove 201 and J-groove 202. Seat 210 can be formed of metal, for example steel, and can be retained by press fit. Seat 210 retains ejector spring 204 against washer 205 and interfaces with sealing element 54 to prevent fluid flow through ejector cap 200. Ejection shoulder 55 of body 40 can interface with washer 205 upon insertion to compress ejector spring 204.

Figure 5B:
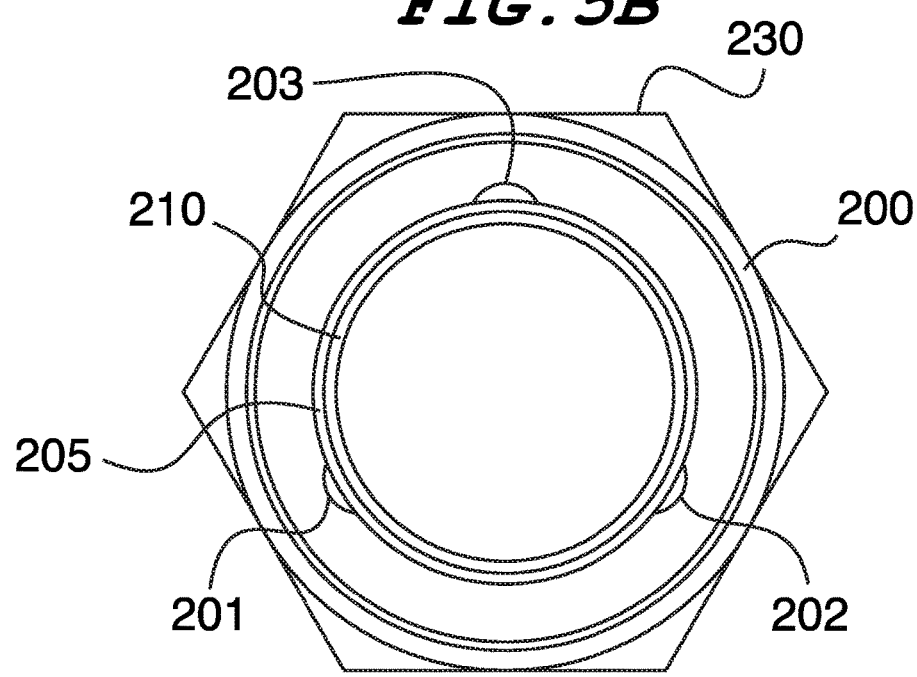
FIG. 5B is a bottom view of an ejector cap in an embodiment of the invention.

FIG. 5B presents a bottom view of an ejector cap in an embodiment of the invention. Ejector cap 200 can comprise hex section 230 shown exterior and facilitates threaded connection of the ejector cap to a fluid system, for example a T connection, not shown. In an embodiment, cartridge 10 comprises three retention balls spaced 120 degrees apart and ejector cap 200 comprises three corresponding J-grooves with entrances spaced accordingly. First J-groove 201, second J-groove 202, and third J-groove 203 are shown on the interior of ejector cap 200. In an embodiment, one or more J-grooves can interface with at least one retention ball to maintain cartridge 10 in ejector cap 200. J-grooves should preferably require maximum compression of ejector spring 204 prior to retention balls arriving at the terminus of the J-groove. This J hook configuration stabilizes the locking configuration cartridge in bayonet latching attachment with the ejector cap 200. In FIG. 5A, maximum axial travel into ejector cap 200 is shown in J-groove 202 prior to the terminus where the maximum travel towards seat 210 peaks.

Figure 6A:
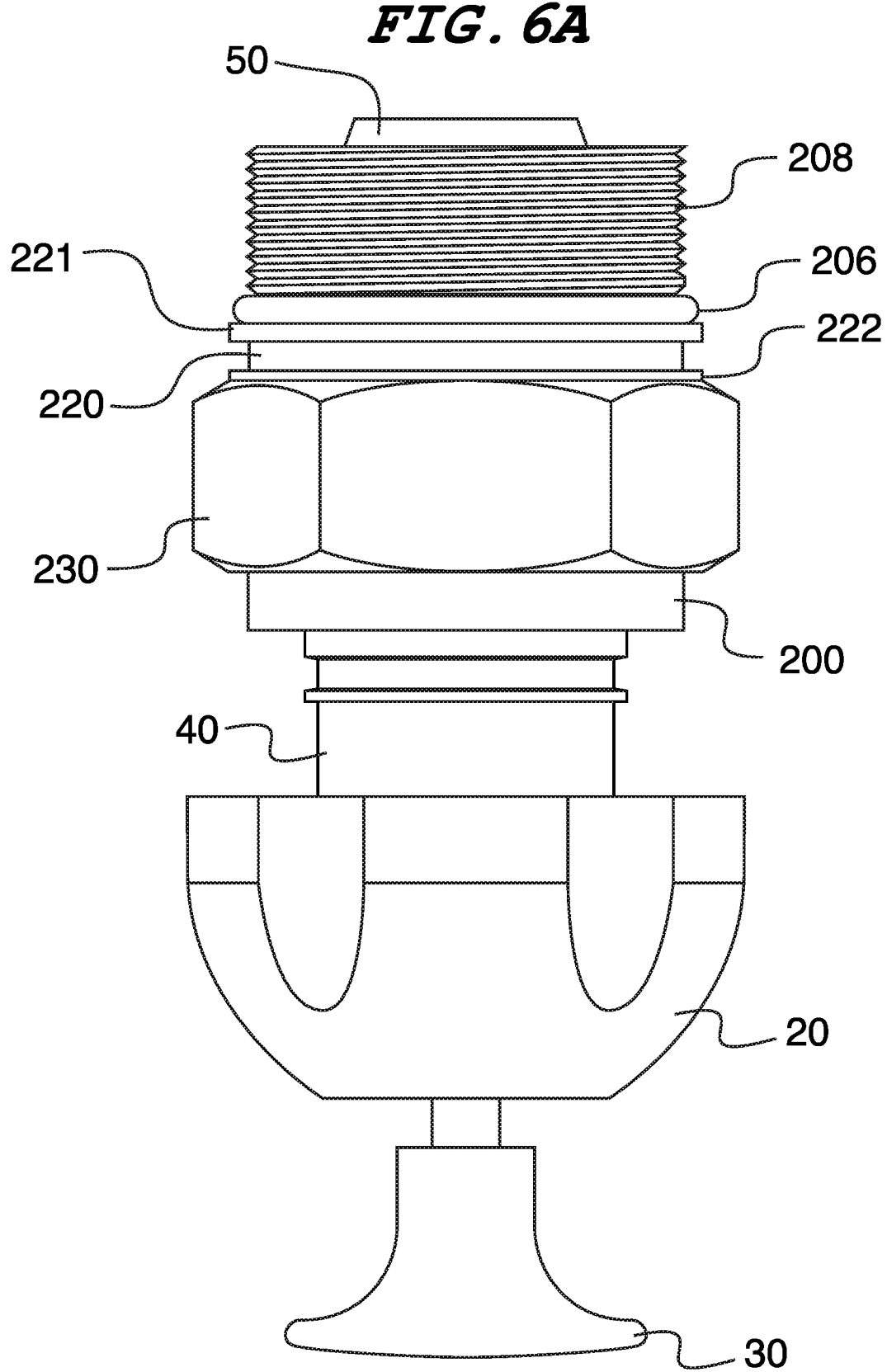
FIG. 6A is a side view of an ejector cap and cartridge in a latched connection in an embodiment of the invention.

FIG. 6A is a side view of an ejector cap 200 and cartridge 10 in a latched connection in an embodiment of the invention. Each of the retention balls can be dimensioned the same for interaction with an ejector cap. Ejector cap 200 can comprise an exterior hex section 230. Restraint groove 220 can be formed between first restraint lip 221 and second restraint lip 222 to accentuate the depth of restraint groove 220 for receiving restraining means that can be, for example, a lanyard. Other restraining means for example rope or cord can also serve to restrain cartridge 10 from falling or being lost when it is ejected by engaging both a restraint groove 220 disposed on ejector cap 200 and a cooperating retainer groove 44 disposed on cartridge 10.

Figure 6B:
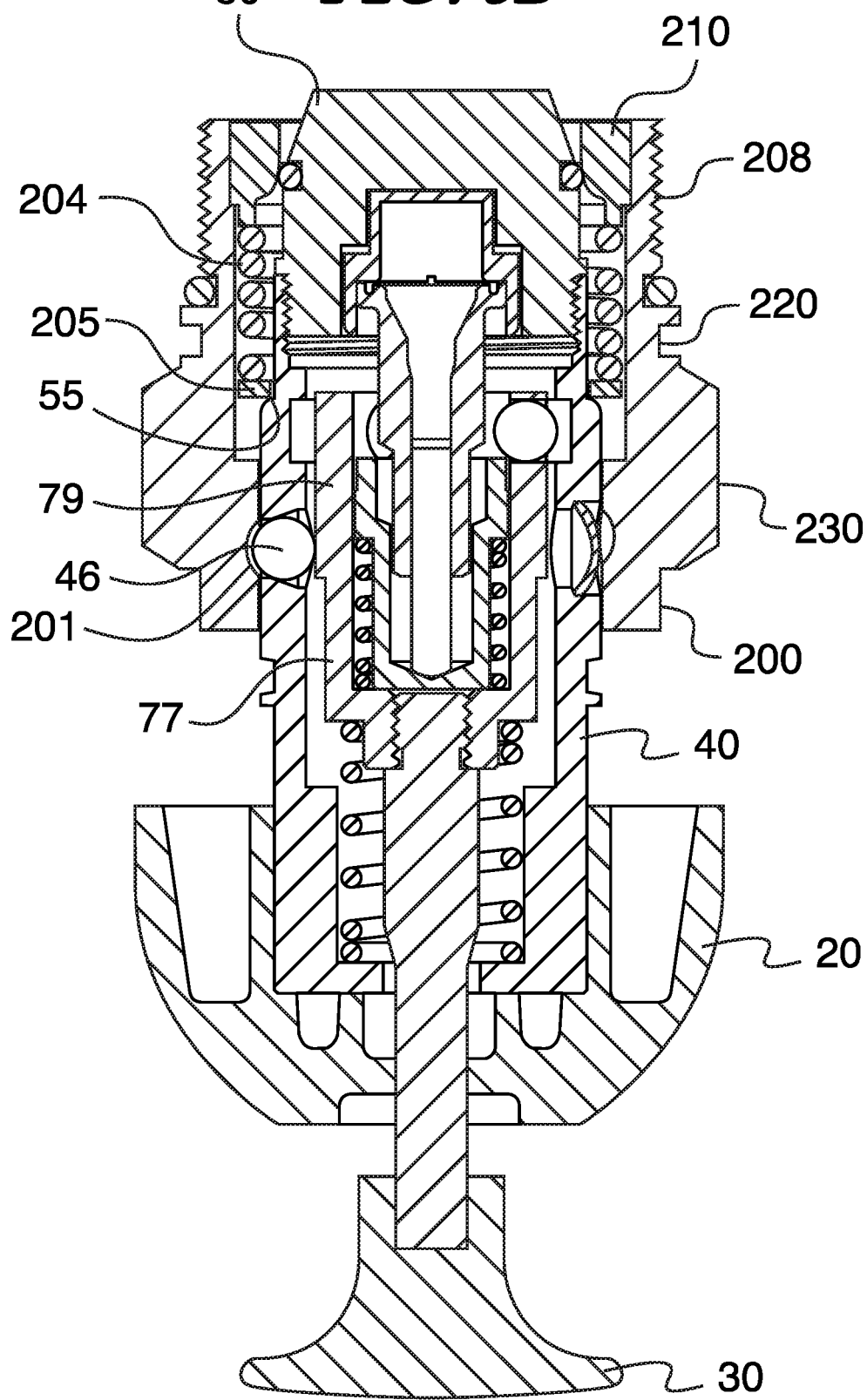
FIG. 6B is a section view of an ejector cap and cartridge in a latched connection in an embodiment of the invention.

FIG. 6B is a section view of an ejector cap and cartridge in a latched connection in a freeze protection embodiment of the invention. First retention ball 46 is shown in J-groove 201. The actuator cam is in the warm state and the locking configuration. Latching section 79 is adjacent first retention ball 46 and other retention balls and forces them out of body 40 and therefore increasing the effective circumference of the cartridge 10. While latching section 79 abuts retention ball 46, the additional size of the retaining mechanism cannot escape ejector cap 200. When the sealing end 50 in contact with a fluid system cools to a target temperature range, the temperature is communicated to thermal actuator means, piston 66 retracts, and recess section 77 is positioned adjacent, for example, first retention ball 46. With the additional interior room, the force of ejector spring 204 and washer 205 can engage a feature such as ejection shoulder 55 to push cartridge 10 out of ejector cap 200. The ejector cap is then open to drain as shown in FIG. 5A. Any fluid in the system can drain by gravity where the drain valve has been positioned in a local low point of the fluid system. To reset the system, the cartridge can be inserted by pushing and turning the cartridge into the J-grooves in the ejector cap 200. Rotation of the cartridge can be facilitated with turn knob 20 for rotation and insertion into an ejector cap shown in FIG. 5A. For cold reset, handle rod 32 can be pulled by a user, or reset handle 30 can be utilized for ease of operation. After the reset cam has been positioned according to FIG. 4C, the cartridge can be inserted into ejector cap 200, even when conditions are cold, or the fluid system is cold, and external latching features engage ejector cap 200.

The cartridge of the current invention provides an internal reset mechanism that can operate within a target temperature range. In an embodiment providing a freeze protection drain valve, the retaining mechanism is activated at a temperature near the freezing point of a liquid. For water, a target temperature near 32 degrees F. can be selected. For example, 33 to 35 degrees F. can be selected as a target temperature range to retract the retaining mechanism and the external latching features so that the cartridge is ejected and a fluid system can be drained. The current invention also provides a reset mechanism so that the cartridge can be reset into a reset configuration and inserted into an ejector cap or other sealing means to close a fluid system. The reset mechanism of the current invention can operate while cold, or within the target temperature range, and the mechanism is internal. The internal reset mechanism is immune to environmental dust and debris and resists fouling. Further, the internal reset mechanism is not vulnerable to field modifications or changes that disrupt the function of the drain valve, ensuring that the automated valve functions as intended.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An automated cartridge comprising:
   a body having a distal end and a proximal end;
   a reset ball;
   a retention ball;
   an actuator cam disposed within said body and biased towards said proximal end by an actuator spring;
   a reset cam disposed within said body and biased away from said actuator cam by a reset spring;
   a thermal assembly configured to move a piston disposed in said reset cam;
   wherein movement of said actuator cam controls movement of said retention ball into a retention opening disposed in said body;
   wherein said reset cam controls radial movement of said reset ball relative an override groove disposed in said body.

2. The automated cartridge of claim 1 wherein said actuator cam comprises a first diameter in a latching section and a second diameter in a recess section.

3. The automated cartridge of claim 2 wherein said latching section is configured to force said retention ball into said retention opening and at least partially out of said body to extend an external latching feature.

4. The automated cartridge of claim 3 wherein said recess section is configured to allow said retention ball to move interior to said body and retract said external latching feature.

5. The automated cartridge of claim 4 wherein:
said actuator cam comprises a reset opening configured to carry said reset ball in an axial direction;
said reset cam is configured to eject said reset ball in a radial direction into said override groove; and
said reset spring is configured to move said reset cam proximal to prevent radial movement of said reset ball out of said override groove.

6. The automated cartridge of claim 5 wherein:
a handle rod is connected to said actuator cam;
movement of said handle rod distal from said body causes said actuator cam to separate from said reset cam and position said latching section adjacent said retention opening; and
said reset ball obstructs movement of said actuator cam until said thermal assembly exceeds a target temperature and moves said reset cam distal from said override groove to contact said reset cam with said actuator cam.

7. The automated cartridge of claim 6 further comprising a reset handle attached to said handle rod.

8. The automated cartridge of claim 3 further comprising:
a sealing end attached to said proximal end;
an ejector cap comprising a J-groove configured to interface with said external latching feature;
an ejector spring compressed between said body and said ejector cap; and
wherein said ejector spring ejects said body upon retraction of said external latching feature.

9. The automated cartridge of claim 8 further comprising a turn knob surrounding said distal end and configured to facilitate the rotation of said body.

10. An automated cartridge comprising:
a valve body comprising a first retention opening, a second retention opening, and a third retention opening;
an actuator cam comprising a first reset opening, a second reset opening, and third reset opening;
a reset cam disposed within said actuator cam and providing an inner border;
an override groove disposed on an interior of said valve body and providing an outer border;
a plurality of reset balls comprising a first reset ball disposed in said first reset opening, a second reset ball disposed in said second reset opening, a third reset ball disposed in said third reset opening;
a plurality of retention balls comprising a first retention ball disposed in said first retention opening, a second retention ball disposed in said second retention opening, and a third retention ball disposed in said third retention opening;
said actuator cam comprises a latching section configured to force said plurality of retention balls exterior to said body to form a latching feature;
a thermal assembly configured to position said latching section adjacent said plurality of retention balls when said thermal assembly is above a target temperature.

11. The automated cartridge of claim 10 wherein said actuator cam comprises a recess section and said thermal assembly is configured to position said recess section adjacent said plurality of retention balls when said thermal assembly is below said target temperature.

12. The automated cartridge of claim 11 wherein said inner border is configured to force said plurality of reset balls against said outer border.

13. An automated drain valve comprising:
an ejector cap comprising at least one J-groove;
a cartridge configured to fluid seal said ejector cap and comprising a latching feature and a thermally responsive reset cam;
wherein said latching feature is configured for rotational insertion into said ejector cap and retention in said at least one J-groove;
a thermal actuator upon cooling to a target temperature configured to position an actuator cam to retract said latching feature and cause ejection of said cartridge from said at least one J-groove of said ejector cap and remove said fluid seal;
said reset cam is configured to block a reset ball and position said actuator cam to extend said latching feature; and
said thermal actuator upon warming above said target temperature moves said reset cam to unblock said reset ball and position said reset cam against said actuator cam to maintain extension of said latching feature.

14. The automated drain valve of claim 13 wherein said latching feature further comprises a retention ball disposed in a retention opening in said actuator cam.

15. The automated drain valve of claim 13 wherein said latching feature further comprises:
a first retention ball disposed in a first retention opening;
a second retention ball disposed in a second retention opening;
and a third retention ball disposed in a third retention opening.

16. The automated drain valve of claim 13 wherein said actuator cam comprises a latching section and a recess section.

17. The automated drain valve of claim 13 wherein said ejector cap comprises an ejector spring disposed between a seat and a washer, and said cartridge comprises an ejection shoulder.

* * * * *